March 6, 1934.     C. E. BUDD     1,950,223
METHOD OF MAKING BRAKE SHOES
Filed April 13, 1931     2 Sheets-Sheet 1
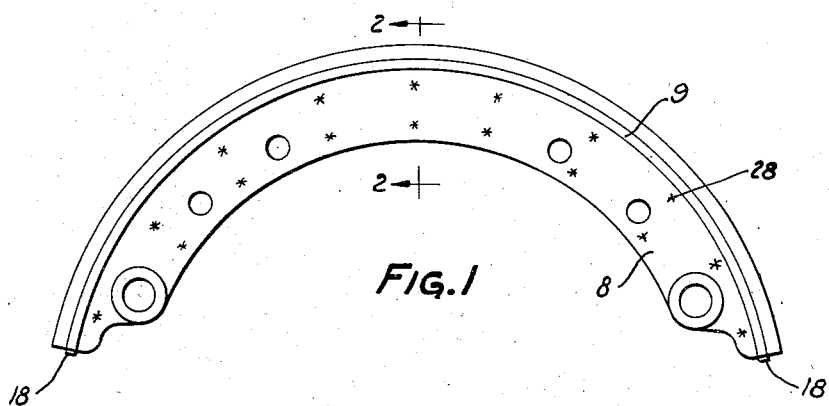
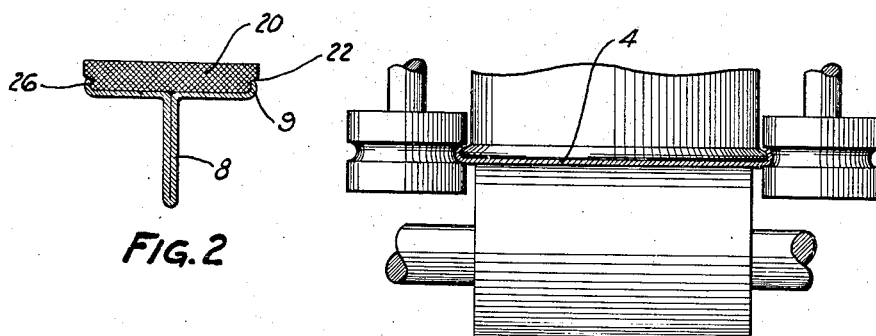
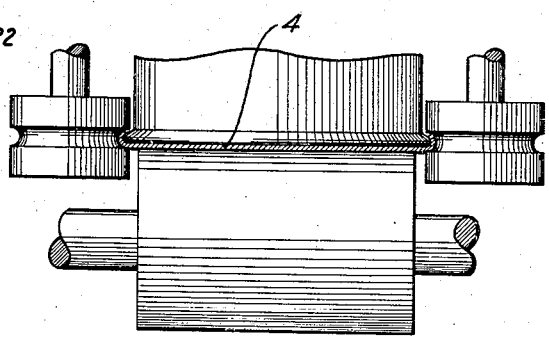
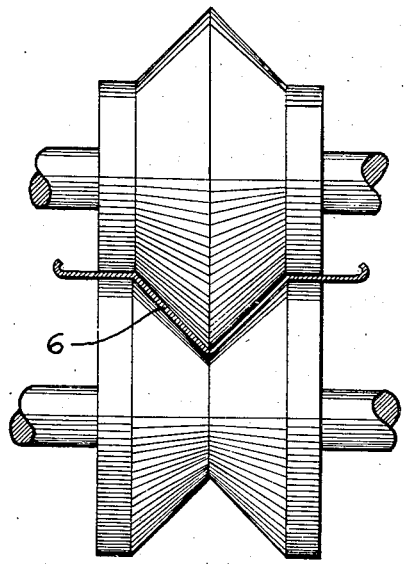
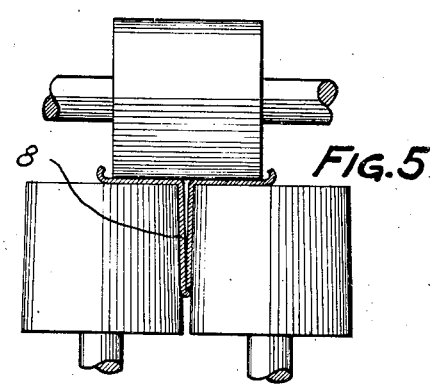
INVENTOR.
CLARENCE E. BUDD
BY *H. Q. Clayton*
ATTORNEY.

March 6, 1934.  C. E. BUDD  1,950,223
METHOD OF MAKING BRAKE SHOES
Filed April 13, 1931   2 Sheets-Sheet 2

INVENTOR.
CLARENCE E. BUDD
BY
H. Q. Clayton
ATTORNEY.

Patented Mar. 6, 1934

1,950,223

UNITED STATES PATENT OFFICE 1,950,223

METHOD OF MAKING BRAKE SHOES

Clarence E. Budd, South Bend, Ind., assignor to Bendix Brake Company, South Bend, Ind., a corporation of Illinois Application April 13, 1931, Serial No. 529,707

3 Claims. (Cl. 29—152.1)

This invention relates to brakes in general, and more particularly to the manufacture, from sheet steel of relatively thin section, of the shoes constituting the principal elements of the brake.

An object of the invention is to provide an inexpensive method of making a light but very strong type of brake shoe, preferably by shaping heated sheet metal by means of suitable rollers and dies to provide a shoe of one piece rim and web section.

A further object of the invention is to provide a combination metallic shoe member and non-metallic lining therefor, the two being inseparably united in the making of the complete unit to thus provide what is sometimes known in the trade as a "non-refillable" brake shoe, that is one unsuitable for relining.

A further object of the invention is to provide a friction material of the molded type, and more particularly a lining formed by extruding plastic stock material through suitable shaping dies to provide a product of the desired cross-sectional shape.

Figure 6:
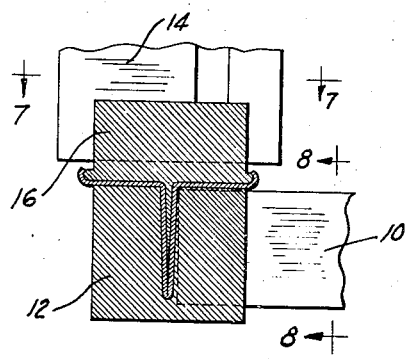
Figure 7:
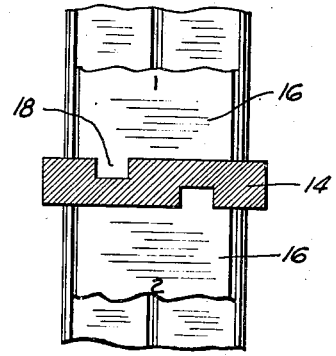
Figure 8:
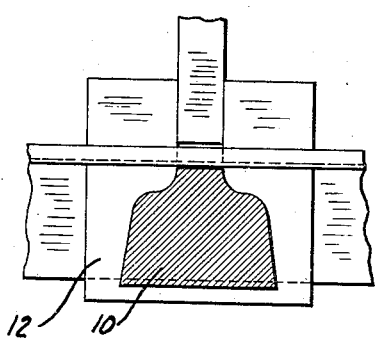
Figure 9:
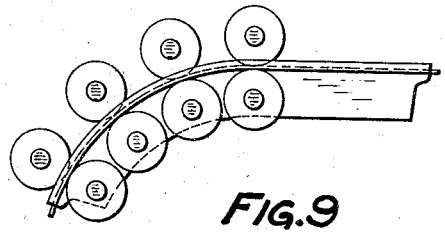
Figure 10:
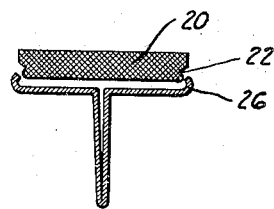
Figure 11:
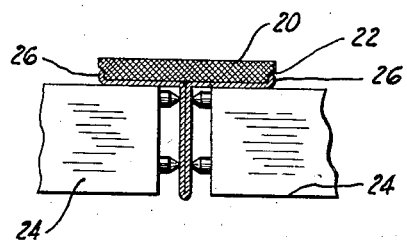

Other objects and features of the invention including various details of the technique involved in the fabricating of the brake shoe and assembled lining will be apparent from the following description of the illustrated method and article shown in the accompanying drawings, in which:

Figure 1 discloses, in side elevation, the brake shoe unit fabricated in the manner described below;

Figure 2 is a section through the shoe of Figure 1 taken on line 2—2 thereof;

Figures 3, 4, and 5 disclose the brake shoe and apparatus for shaping the same in various of the preliminary shaping steps;

Figure 6 discloses the shoe and the apparatus for forming the end or stop members to secure the lining in position;

Figures 7 and 8 are sections taken respectively on lines 7—7 and 8—8 of Figure 6 showing the punching apparatus in detail;

Figure 9 discloses the step of arcing the shoe to the finished shape;

Figure 10 discloses the friction material positioned on the rim face ready for the final crimping and welding steps; and Figure 11 discloses the shoe and lining in section, the web member being welded together to complete the non-refillable shoe.

According to one manner of constructing my brake shoe unit the relatively thin sheet steel stock 10 of Figure 3 is first heated to a working temperature and then successively passed through the shaping rollers of Figures 3, 4 and 5, respectively, suitable intermediate rollers being provided to render the operation continuous and to bring the material to the cross-sectional shape disclosed in Figure 5. It will be seen that the metal is rolled to provide a V-shaped channel 6, Figure 4, and that the walls of the channel are then folded to provide the double-thickness stiffening web portion 8 of Figure 5.

The stock so shaped is then cut to length by the punch 10 of Figures 6 and 8, die 12 cooperating therewith to provide the rounded shoe web end contour of the finished product of Figure 1. Simultaneous with or subsequent to the cutting of the web portion of the shoe there is effected the severing of the rim portion 9, the punch 14, Figures 6 and 7, and the holding mandrels or dies 16 cooperating to retain this work in position. In this last described operation end tabs or stops 18 are formed to be employed as described hereinafter. The shoe sections are then rolled to the desired arc as disclosed in Figure 9 completing the rolling operation.

According to a feature of my invention the friction material 20 of Figures 10 and 11 is made by extruding a homogeneous plastic and workable mass of suitable ingredients through suitable dies to provide the V-shaped side indentation 22. After shaping and curing the extruded lining is cut to length to fit the brake shoe and then positioned on the rim face of the latter as disclosed in Figure 10.

The last series of steps involve the pressing together of the web portions of the shoe by means of the laterally movable electrodes 24, the edge flanges 26 of the rim 9 fitting within the indentations 22 and securely clamping the lining in position. The welding operation is then effected to provide the spot welds 28, Figure 1, and lastly the tabs 18, Figure 7, are bent up to abut the end faces of the lining to thereby obviate longitudinal movement or creeping of the same. If desired, the rim and web members of Figure 11 may be made in two complementary separate pieces and welded together to effect the same structure as this figure.

A very simple and effective process is thus provided involving a minimum of steps and employing a very cheap form of stock material. The extruded friction material is quite homogeneous and may be made from the cheapest ingredients including the plentiful short staple asbestos. The shape of the friction material is also very uniform when effected by the extruding operation. The lining and shoe body are quite inseparable and once the lining is worn in service down to the periphery of the flanges 26 the entire shoe must necessarily be discarded; this for the obvious reason that the lining cannot be replaced.

It is not my intention to limit the scope of my invention to the manufacture of the particular shoes described, nor to the particular technique involved, nor otherwise than by the terms of the appended claims.

I claim:

1. That method of making a brake shoe segment of relatively thin metal which comprises rolling a strip of flat sheet metal stock to first form curved lining securing flanges at the edges of the strip and then further rolling said stock to fold the material between the flanges and provide two substantially parallel portions presenting a double thickness stiffening web portion.

2. That method of making a brake shoe segment of relatively thin metal which comprises rolling a strip of flat sheet metal stock to first form the material to channel section, further rolling said stock to fold the material and provide two substantially parallel portions between the flanges of said channel section to provide a double thickness stiffening web portion, and then cutting said strip to brake shoe length and otherwise shaping said web portions to provide ends of curved contour.

3. That method of making a shoe segment from sheet steel stock of less thickness than the thickness of a component part of the completed segment, which comprises feeding the sheet metal through rollers to form a channel, bending the material intermediate the edges of the channel to V-shape, then further rolling said material to collapse the V-section portion to provide a double thickness web portion.

4. That method of making a shoe segment from sheet steel stock of less thickness than the thickness of a component part of the completed segment, which comprises feeding the sheet metal through rollers to form the material into channel shape, bending the material so formed intermediate the edges of the channel to V-shape, further rolling said material to collapse the V-shape portion to provide a double thickness web portion, and then bending the structure so formed on an arc and cutting and shaping the web portion at its ends.

5. That method of making a non-refillable brake shoe which comprises shaping a flat piece of relatively narrow gage stock to a channel section, bending the material so formed intermediate its edges to provide a V-section portion, positioning a segment of brake lining within said channel and then crimping said V-section to clamp the lining firmly in position in said channel.

6. That method of making a non-refillable brake shoe which comprises shaping a flat piece of relatively narrow gage stock to provide a channel-section structure, the edges of the channel constituting curved flanges, bending the material so formed intermediate its edges to provide a V-section portion, positioning a segment of brake lining within said channel, said lining segment being provided with indentations at its side edges and then crimping said V-section to clamp the lining firmly in position in said channel with curved flanges of the channel fitting within the aforementioned lining indentations.

7. That method of making a non-refillable brake shoe which comprises shaping a flat piece of relatively narrow gage stock to a channel section, bending the material so formed intermediate its edges to provide a V-section portion, positioning a segment of brake lining within said channel and then crimping said V-section to clamp the lining firmly in position in said channel, and permanently securing the sides of said V-section together with the lining so clamped.

8. That method of making a non-refillable brake shoe which comprises shaping a flat piece of relatively narrow gage stock to provide a channel-section structure, the edges of the channel constituting curved flanges, bending the material so formed intermediate its edges to provide a V-section portion, positioning a segment of brake lining within said channel, said lining segment being provided with indentations at its side edges and then crimping said V-section to clamp the lining firmly in position in said channel with the curved flanges of the channel fitting within the aforementioned lining indentations, and permanently securing the sides of said V-section together with the lining so clamped.

CLARENCE E. BUDD.